United States Patent [19]
Cavestri

[11] Patent Number: 5,742,066
[45] Date of Patent: Apr. 21, 1998

[54] LIGHT SOURCE FOR USE IN LEAK DETECTION IN HEATING, VENTILATING, AND AIR CONDITIONING SYSTEMS THAT UTILIZE ENVIRONMENTALLY-SAFE MATERIALS

[75] Inventor: Richard C. Cavestri, Columbus, Ohio

[73] Assignee: Bright Solutions, Inc., Troy, Mich.

[21] Appl. No.: 598,434

[22] Filed: Feb. 8, 1996

[51] Int. Cl.[6] .................................................. G01J 1/00
[52] U.S. Cl. ............................................. 250/504 R
[58] Field of Search ......................... 250/493.1, 504 R, 250/504 H

[56] References Cited

U.S. PATENT DOCUMENTS

Re. 35,395  12/1996  Henry ..................................... 73/40.7
3,665,179   5/1972   McLintic ................................ 240/41.3
4,385,344   5/1983   Gonser .................................. 250/504 R
4,563,589   1/1986   Scheffer ................................ 250/504 R
4,785,383   11/1988  Tamay .................................... 362/226
5,184,044   2/1993   Thomas ................................... 313/638
5,347,438   9/1994   Lerner ................................... 362/186
5,357,782   10/1994  Henry .................................... 73/40.7
5,421,192   6/1995   Henry .................................... 73/40.7
5,453,883   9/1995   Chazallet ............................... 359/890

Primary Examiner—Bruce Anderson
Attorney, Agent, or Firm—Robert J. Black

[57] ABSTRACT

A light source for use in examining leak detection sites in heating, ventilating, and air conditioning systems that utilize a fluorescence-producing dye in the refrigerant to determine the presence of leaks. The light source combines a dichroic reflector with a lamp and interference filter to provide a narrowed emission of wavelength of light emitted from the light source.

21 Claims, 1 Drawing Sheet

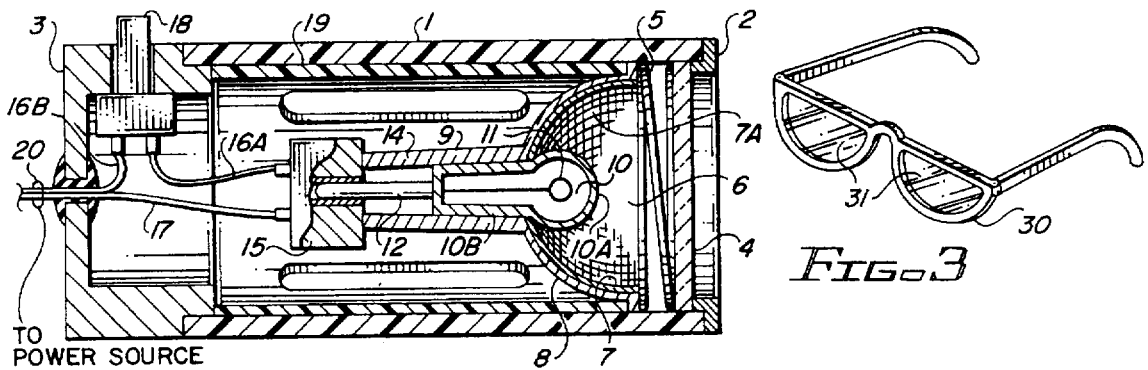
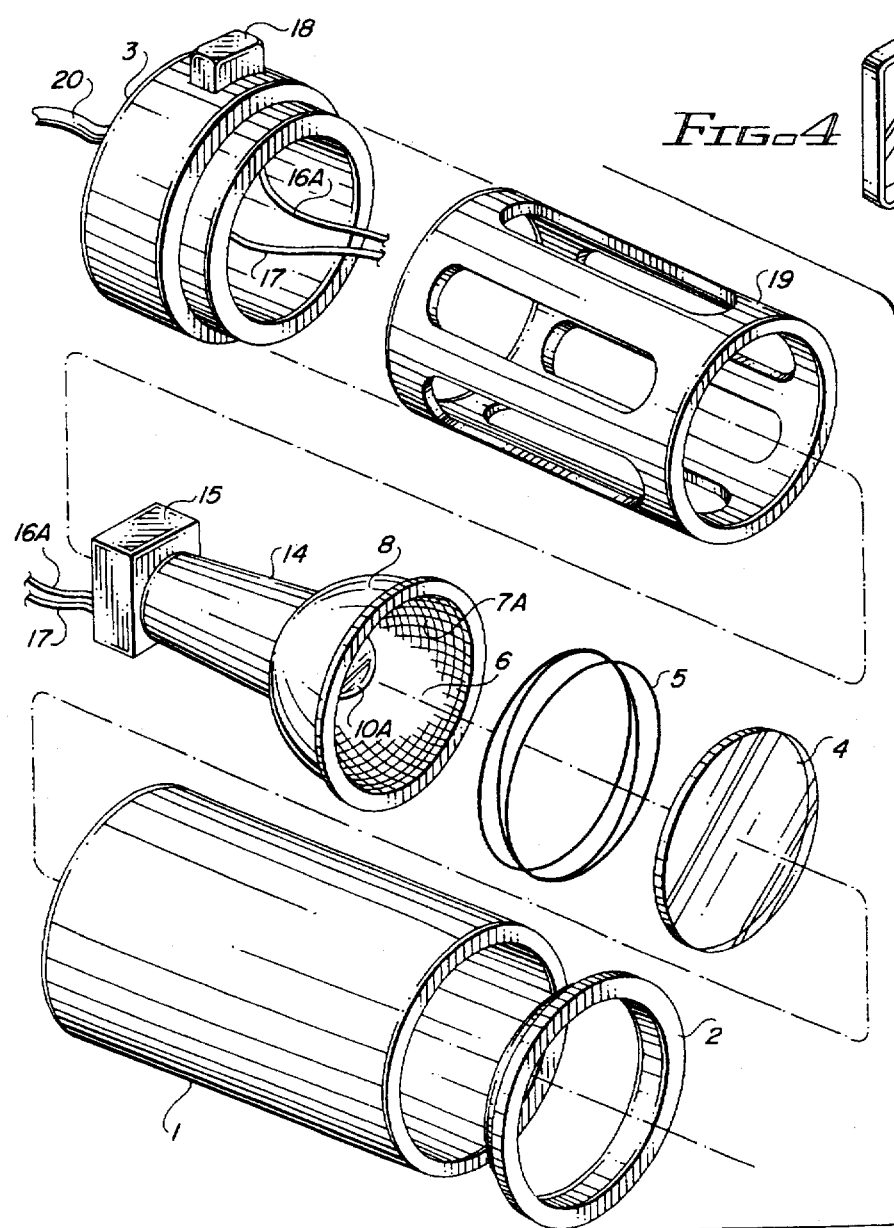

5,742,066

LIGHT SOURCE FOR USE IN LEAK DETECTION IN HEATING, VENTILATING, AND AIR CONDITIONING SYSTEMS THAT UTILIZE ENVIRONMENTALLY-SAFE MATERIALS

BACKGROUND OF THE INVENTION

1. Field of the Invention

The present invention relates to a light source for use in detecting leaks in heating, ventilating, and air conditioning systems. Particularly, the present invention relates to a light source which is able to detect substances which reemit light at wavelengths greater than the wavelength of light emitted from the light source.

2. Background Art

Because of the damage that chlorofluorocarbon (CFC) refrigerants are doing to the ozone layer, it has become necessary to develop alternative refrigerants which are environmentally "friendly". DuPont, International Chemicals, and others have developed hydrofluorocarbon (HFC) refrigerants which are much safer for the environment and have an ozone depletion factor ranging from zero to a fraction of the ozone depletion factor of CFC refrigerants.

By means of the addition of certain dyes to the refrigerants and/or lubricants, such as naphthalimide, perylene, thioxanthane, coumarin, or fluorescene, leaks can be detected by the presence of a fluorescence existing at leak sites when examined under light sources having appropriate or specific characteristics. Such leak detection techniques are known and described in U.S. Pat. Nos. 5,357,782 and 5,421,192 which issued to Richard G. Henry on Oct. 25, 1994, and Jun. 6, 1995, respectively, both of which are assigned to the same assignee as the assignee of the present application.

It has been determined that in detecting the fluorescence present in such detection applications that optimum visibility of the fluorescence occurs when the leaks are detected under a light having an emission wavelength between 300 and 700 nanometers. In the past, ultraviolet light sources have been utilized for this particular usage, but have not provided the optimum performance inasmuch as they have generated light primarily in the ultraviolet range found normally between 300 to 450 nanometers.

A search of the background art directed at the subject matter of the present invention conducted in the U.S. Patent and Trademark Office disclosed the following U.S. Letters Patent:

| | | |
|---|---|---|
| 4,558,014 | 4,775,853 | 5,059,790 |
| 5,131,755 | 5,156,976 | 5,192,510 |
| 5,347,438 | 5,349,468 | 5,394,133 |
| 5,399,499 | 5,441,531 | |

Additional patents known to the Applicant of the present application include the following:

4,758,366
5,149,453
5,357,782
5,421,192

None of the above-identified patents are believed to claim, teach, or disclose the novel combination of elements and functions set forth in the present invention.

The intent of the present apparatus is to provide a light source that functions to provide an optimized unit for use in those industries or technologies that require the aiming of light in specific wavelengths at a substance to cause fluorescence. This is done in the leak detection industry, as well as in the non-destructive testing industry. In both instances, substances such as dyes will fluoresce brightly under light sources which emit light in the 300 to 500 nanometer range, whereas no, or minimal, fluorescence is detected under ambient light of typical wavelengths.

Historically, the light sources used for these types of applications were large alternating current lamps operating on either 110 to 220 volts. Such lamps, known as PAR 38, were manufactured by Phillips and other manufacturers. Usually, such lamps were in the 100–200 watt range, producing a substantial amount of light emitted outside of the desired range to produce the desired fluorescent response. These lamps also created a large amount of heat, and required the use of a ballast which provided additional bulk and weight.

Substantially later, self-ballasted lamps were developed overcoming some of the previous drawbacks. However, they were prone to relatively long warm-up periods and were very sensitive to voltage surges which would cause the light to be turned off, and subsequently required a lengthy cool-down period followed by another warm-up period.

More recently, small direct current lamps of the halogen type, or similar, rich in gases such as xenon were developed. Such lamps had the advantage of requiring no ballast, were small in dimension, light weight, and were not subject to voltage surges or spiking. They also provided portability and could be powered by batteries. Such lamps, however, did not provide a great output of light in the desirable ranges, and therefore did not fluoresce efficiently so as to observe materials with sufficient brightness to meet the needs of most users. This was probably the result of the usage of metal reflectors, such as smooth aluminum, which lack the beam focus to cause light of sufficient candle power at the site of fluorescence, i.e., the leak site.

Accordingly, it is the object of the present invention to provide a light source that is small, light weight, not subject to voltage surges, durable, and produces a large output of light in the wavelength required to effectively fluoresce the above-mentioned fluorescent dyes.

SUMMARY OF THE INVENTION

In the field of leak and crack detection and related non-destructive testing, different dyes are utilized which fluoresce at different wavelengths. Fluorescence is usually defined as the reemission of light at wavelengths greater than the wavelength of light emitted from the light source with which examination takes place.

The key to the lighting system of the present invention lies in the utilization of tungsten halogen lamps with an integral reflector, which provides an effective lighting system, with the characteristics being determined by the reflector design and the included lamp, as well as alignment of the lamp with the reflector. The usual single-ended tungsten halogen lamp as described herein is mounted in the axis of the reflector with the base pointing out from the reflector apex towards the rear. The reflectors provided are often focusing reflectors which concentrate the light generated by the built-in lamp to a more or less small or defined spot at a distance from the reflector and its axis. Reflector geometry utilized for these purposes is usually ellipsoid wherein the lamp filament lies in the first focal point of the ellipsoid and hence focuses in the second. However, if the shape of the reflector is paraboloid, this can create a collimating reflector which would generate parallel beams of light.

Many of the reflectors utilized in the halogen lamps described utilize faceted or structured surfaces rather than smooth surfaces to modify light distribution. This arrangement improves the evenness of the light and can increase the beam angle, or smooth or break up the light-dark edges. Facets on the surfaces of the reflectors range from fine, scarcely visible grains to clearly visible faceting, with the effect being correspondingly less or more pronounced. With the combination of the correct paraboloid or ellipsoid shape, such lamps are able to finely control focus. Smooth aluminum reflectors have been utilized but do not permit the geometric balances and dimensional stability that are provided by the glass reflectors found in newer halogen lamps. Accordingly, the material choice for such reflectors is glass, with the inner domed reflector surface being suitably coated to obtain the required reflective properties. These coatings are generally applied by vapor deposition. It is known that such glass reflectors have absolute dimensional stability and a surface that can be readily modified by applying coatings to the reflective surface.

When material to be examined requires detection of fluorescence, the wavelength of the light to be emitted from the light source is to be more closely defined. Such precision of definition and control of wavelength may be controlled by use of reflectors with dichroic coatings. Dichroic coatings produce their reflection properties through the phenomenon of interference. They consist of many (up to several dozen) very thin layers, each only a quarter of a wavelength of the light thick, alternating between materials of a high and low refractive index. Fine tuning of the thickness of the layers and the way they are combined enable virtually any reflection curve to be created. The maximum reflectivity is nearly 100%, and there is virtually no absorption of radiation in the regions of low reflectivity. Accordingly, dichroic reflectors are loss-free, and what they do not reflect, they pass through.

Among the best known members of the dichroic family are the cold-light reflectors, which reflect visible light between about 300 and 750 nanometers and allow radiated heat to pass unhindered through the glass reflected to the rear. This arrangement greatly reduces thermal load on the illuminated surface or object. Blue reflectors and ultraviolet reflectors are other types of reflectors. In the case of the blue-light reflector, only the blue region of the spectrum (between 400 and 500 nanometers) is reflected, while in the case of the ultraviolet reflector, only the ultraviolet range emitted by the lamp is reflected. This range is usually determined as being between about 300 to 400 nanometers.

Such cold-light reflectors fluoresce dyes extremely well in that most fluorescent dyes are excited to fluorescence by light in the same nanometer range as produced from the cold-light reflectors, i.e., from 300 to 500 nanometers. Light produced outside these ranges is largely wasted and will not produce the desired fluorescence and may detract from the ability of a user to clearly see the fluorescence. Thus, dichroic reflectors, with their narrow bandwidth of light output reflected from the lamps lend themselves ideally in providing excitation wavelengths (for fluorescing materials) and providing precision not possible using other types of reflectors.

Such lamps are also effective at the spectral width in the range required for fluorescence, providing extremely strong intensity of light with the accurate focusing required for leak detection technology. Such an arrangement results in a focal point that can produce as high as 10,000 to 15,000 candle power from extremely small light sources, especially for beam spreads of 6° to 14°. In general, the narrower the beam spread, the greater the candle power and the greater the intensity of fluorescence created.

It is also possible to more narrowly define the spectral output from such reflector lamps by the utilization of optical filters. Such optical filters can be an integral part of the reflector unit or can be independent of the reflector lamp but used in conjunction with it. In both instances, light output from the reflector lamp is reduced to pass only the desired wavelength for the application. It is also possible for the filter to be used solely for safety purposes, by the utilization of clear glass, which would not restrict the bandwidth of light passed through. Generally, it is possible for two types of filters to be utilized, which may be absorption or dichroic filters. The dichroic filters, again, operate on the same principal of interference, as in the discussion above relating to the use of dichroic reflectors.

Additionally, it may be possible to further tailor light output from light sources in accordance with the present invention by the utilization of shields or eyewear by the user to permit only light of certain wavelengths to pass through. This eyewear can take several forms, including glasses, goggles, and face shields. Thus, the eyewear, when used in combination with filters, permits the ultimate fine tuning of wavelength for detection of fluorescence.

In the arrangement taught in the present invention, components consist of a housing wherein there is mounted a light source, including a dichroic reflector with a lamp included therein, with a reflective faceted dichroic filter surface surrounding the portion of the lamp that includes the filament. In addition, ahead of the lamp assembly is a filter lens, which in most cases is an absorption type filter that acts to further restrict the particular wavelength of the light emitted from the light source, controlling the light emitting therefrom to within the specific range reflected by the dichroic reflector. This latter filter may be eliminated when used with blue light and ultraviolet light reflectors.

An on/off switch is also included within the container that provides control of the connection to an external power source for the light source. Thus, it can be seen that by means of the combination of the dichroic reflector and an absorption-type filter placed ahead of the light source, a predetermined narrowed beam of light will be emitted from the light source of the present unit. Additional features and advantages of the invention will become apparent from the detailed description of the preferred embodiments of the invention as set forth in the following.

BRIEF DESCRIPTION OF THE DRAWINGS

Preferred embodiments of the invention will be described in detail with reference to the accompanying drawings wherein:

FIG. 1 is a sectional view of a light source for use in examination of substances which reemit light at a wavelength greater than the wavelength of the light emitted from the light source in accordance with the preferred embodiment of the present invention.

FIG. 2 is an exploded view of a light source in accordance with the present invention.

FIG. 3 is a perspective view of eyewear including long wavelength pass material for use in conjunction with the light source of the present invention.

FIG. 4 is a perspective view of a shield including long wavelength pass material for use in conjunction with the light source of the present invention.

DETAILED DESCRIPTION OF THE PREFERRED EMBODIMENTS

The present invention will best be understood by reference to the drawings wherein similar components are designated by the same referenced numerals.

Referring now to FIGS. 1 and 2, the preferred embodiment of the light source of the present invention consists of a housing constructed of phenolic, plastic or suitable material. The unit is cylindrical in construction and hollow and has affixed at either end thereto front cap 2 and rear cap 3, both caps being constructed of aluminum or other suitable materials. As may be seen in the drawings, front cap 2 is open to the exterior and has positioned directly behind it filter lens 4, which in the preferred embodiment consists of a BSI lens filter, No. PS-600. This filter provides maximum transmission of light at a wavelength of approximately 400 nanometers, wherein about 82% of the light at that wavelength is transmitted through the filter lens.

Located directly behind the filter lens 4 is a compression spring 5 which aides in positioning the lens and reflector 6 in proper spacial relationship within the housing and further provides some shock-absorbing assistance.

Reflector 6, located behind filter lens 4 and separated by compression spring 5, is preferably a molded glass reflector of the type generally referred to in the lighting industry by the letters "MR". A number following the letters "MR" indicate the diameter of the reflector in ⅛" increments. In the present embodiment, an MR16 reflector is used which has a diameter of about 2.0", i.e., about 51 mm.

Units of this type are produced by several major lighting manufacturers in the United States, Europe, and Japan. Such reflectors are produced by the General Electric Company, Osram-Sylvania, etc.

Most of the reflectors are used extensively to produce low-voltage, high-intensity lamps utilized for applications such as display lighting. As previously indicated, molded reflectors of the type described are typically finished with a reflective coating on front surface 9. This surface is usually a multilayer interference filter configured to reflect visible light from the reflector and transmit heat through the reflector. The front surface 9 is provided with facets 7A, while providing a uniform beam of illumination from lamp 10. The particular (tungsten halogen) lamp chosen herein, which would be of the MR16 type EXT, provides a narrow spot type of beam with approximately a 12° spread. Extending from back surface 8 of reflector 6 is mounting portion 14. An aperture extending through the reflector at the apex thereof is usually an elongated, generally rectangular aperture configured to accept a range of suitable lamp (bulbs) such as lamp 10. Lamp 10 has a filament portion 10A and a neck portion 10B, including therein is filament 11, which is connected at its rear to terminal 12 and terminal 13 (not shown). (Terminal 13 is not visible in the present view because it is parallel to terminal 12.) This lamp is normally an incandescent light source, such as a halogen bulb, with the envelope consisting of filament portion 10A and neck portion 10B being constructed of glass or quartz. Lamp 10 is mounted in mounting portion 14 with the filament portion 10A extending beyond the front surface 9 of reflector 6. A socket 15 receiving terminals 12 and 13 provides connections to circuit conductors 16 and 17. Socket 15 is constructed of ceramic or similar material. Conductor portion 16A extends to on/off switch 18 and continues through conductor portion 16B to an external power source 20. The other conductor 17 extends directly from socket 15 to the power source 20.

An MR16 lamp, as shown herein, typically operates from a 12 volt source and draws approximately 50 watts of power. The power source 20 may consist of a battery, generator or dynamo. Switch 18 is utilized to turn the light source on or off during usage of the present novel light source to examine substances which reemit light at wavelengths greater than the wavelength of the light emitted from the light source of the present invention.

Heat shield 19 extends around the rear portion of reflector 6, mounting portion 14, and socket 15, and is held in place against the rear of reflector 6 by means of portions of rear cap 3. The heat shield is necessary inasmuch as that light which is not transmitted in a forward direction by means of reflector 6 is transmitted as heat through the back surface 8 and neck portion 14 of reflector 6 assists in maintaining the present unit as comfortable to the touch during operation.

It should be noted that MR16 type reflectors complete with a halogen lamp included therein are available from Osram-Sylvania and other sources as noted previously. The lamp 10, preferably is bonded to mounting portion 14 probably by means of a suitable adhesive, such as a silicon or epoxy based adhesive.

It should be noted that the unit as described includes a dichroic reflector. Dichroic reflective coatings produce specific reflection properties through the phenomenon of interference. They consist of many (up to 40 very thin layers), each only a quarter of the wavelength of the light thickness, and alternately of materials with a high and low refractive index. Accordingly, reflectivity is nearly 100% with virtually no absorption of radiation in the region of low reflectability. The best known member of this group in the light source of the present embodiment is probably that type referred to as a cold-light reflector in that it reflects only visible light between approximately 400 to 700 nanometers and allows any radiated heat to pass unhindered through the glass reflector to the rear. Thus, the thermal load on the illuminated surface or object is very much reduced.

The effectiveness of the light source is enhanced when the user utilizes a shield 40 or eyewear 30 including long wavelength pass material 31 or 41 to further restrict the wavelength of light from the light source of the present invention.

While but a single embodiment of the present invention has been shown, it will be obvious to those skilled in the art that numerous modifications may be made without departing from the spirit of the present invention, which shall be limited only by the scope of the claims appended hereto.

What is claimed is:

1. A light source for examination of a substance which reemits light at a wavelength greater than the wavelength of light emitted from said light source, said light source comprising:

a lamp assembly including;

a dichroic white light reflector;

said dichroic white light reflector is a focusing reflector;

a lamp positioned between said dichroic white light reflector and said substance;

said lamp connected to a source of electrical power and operated in response to said electrical power to emit light;

said dichroic white light reflector functioning to reflect a selected portion of said light emitted from said lamp;

a lens filter positioned between said lamp assembly and said substance;

said lens filter operated to further restrict said light from said lamp and said light reflected by said dichroic white light reflector;

whereby said light emitted from said light source is restricted to a predetermined range effective to enhance the reemission of light from said substance.

2. A light source as claimed in claim 1 wherein:
said lamp is a tungsten halogen lamp.

3. A light source as claimed in claim 1 wherein:
said dichroic reflector is ellipsoid in shape.

4. A light source as claimed in claim 1 wherein:
said dichroic reflector is paraboloid in shape.

5. A light source as claimed in claim 1 wherein:
said dichroic reflector includes a collimated surface.

6. A light source as claimed in claim 1 wherein:
said dichroic reflector is made of glass.

7. A light source as claimed in claim 1 wherein:
said dichroic reflector is a cold-light reflector reflecting light in the wavelength between 400 and 700 nanometers.

8. A light source as claimed in claim 1 wherein:
said dichroic reflector reflects light primarily in the blue emission range having a wavelength of between 400 and 600 nanometers.

9. A light source as claimed in claim 1 wherein:
said dichroic reflector reflects light primarily in the ultraviolet range between 300 to 450 nanometers.

10. A light source as claimed in claim 1 wherein:
said lamp assembly further includes a protective shield functioning as an absorption filter.

11. A light source as claimed in claim 1 wherein:
said lamp assembly is prefocused to a predetermined beam spread.

12. A light source as claimed in claim 1 wherein:
said lens filter is an interference filter.

13. A light source as claimed in claim 1 wherein:
said lens filter is an absorption filter.

14. A light source as claimed in claim 1 wherein:
said substance is a leak detection dye.

15. A light source as claimed in claim 14 wherein:
said dye is chosen from a group including naphthalimide, perylene, thioxanthine, coumarin, and fluorescene.

16. A light source as claimed in claim 1 wherein:
said wavelength of light emitted from said source is further restricted by the utilization of filter lens eyewear, or in the alternative a filter shield, employed by a user of said light source.

17. A light source as claimed in claim 16 wherein:
said wavelength of light emitted from said source is further restricted by the inclusion of long wavelength pass material in said filter lens eyewear or in the alternative included in said filter shield.

18. A light source as claimed in claim 1 wherein:
there is further included a shock absorbing compression spring positioned between said lamp and said lens filter functioning to maintain proper spacial relationship between said lamp and said filter lens.

19. A light source for examination of a substance which reemits light at a wavelength greater than the wavelength of light emitted from said light source, said light source comprising:

a lamp assembly including;

a dichroic white light reflector reflecting light primarily in an emission range having a wavelength between 300 and 600 nanometers;

said dichroic white light reflector is a focusing reflector;

a lamp positioned between said dichroic reflector and said substance;

said lamp connected to a source of electrical power and operated in response to said electrical power to emit light;

said dichroic reflector functioning to reflect a selected portion of said light emitted from said lamp;

whereby said light emitted from said light source is restricted to a predetermined range effective to enhance the reemission of light from said substance.

20. A light source as claimed in claim 19 wherein:
said dichroic reflector reflects light primarily in the blue emission range having a wavelength of between 400 and 600 nanometers.

21. A light source as claimed in claim 19 wherein:
said dichroic reflector reflects light primarily in the ultraviolet range between 300 to 450 nanometers.

\* \* \* \* \*